United States Patent
Fitzpatrick et al.

(10) Patent No.: US 10,549,656 B2
(45) Date of Patent: Feb. 4, 2020

(54) VEHICLE WITH MOVEABLE INTERIOR DOOR PANEL

(71) Applicant: Faurecia Interior Systems, Inc., Auburn Hills, MI (US)

(72) Inventors: Robert Fitzpatrick, Holland, MI (US); Brian Dexter, Grand Haven, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 42 days.

(21) Appl. No.: 15/852,676

(22) Filed: Dec. 22, 2017

(65) Prior Publication Data
US 2018/0186253 A1    Jul. 5, 2018

Related U.S. Application Data

(60) Provisional application No. 62/440,661, filed on Dec. 30, 2016.

(51) Int. Cl.
| | |
|---|---|
| *B60N 2/14* | (2006.01) |
| *B60R 21/04* | (2006.01) |
| *B60J 5/04* | (2006.01) |
| *B60R 13/02* | (2006.01) |
| *B60N 2/02* | (2006.01) |

(52) U.S. Cl.
CPC ............ *B60N 2/143* (2013.01); *B60J 5/0486* (2013.01); *B60R 13/0243* (2013.01); *B60R 21/0428* (2013.01); *B60N 2002/0216* (2013.01); *B60R 2013/0287* (2013.01)

(58) Field of Classification Search
CPC ............ B60N 2/143; B60N 2002/0216; B60R 21/0428; B60R 13/0243; B60R 2013/0287; B60J 5/0486
See application file for complete search history.

(56) References Cited

U.S. PATENT DOCUMENTS

| 1,742,447 | A | 1/1930 | McKeag | |
| 2015/0203006 | A1* | 7/2015 | Hipshier | B60R 7/04 |
| | | | | 296/153 |

FOREIGN PATENT DOCUMENTS

| DE | 19714404 A1 | 12/1997 |
| DE | 102013202932 A1 | 8/2014 |

* cited by examiner

*Primary Examiner* — D Glenn Dayoan
*Assistant Examiner* — Melissa Ann Bonifazi
(74) *Attorney, Agent, or Firm* — Reising Ethington P.C.

(57) ABSTRACT

A personal automotive vehicle includes a seat and a moveable door panel in an interior of the passenger cabin, both of which are moveable between a forward and a rearward position. The moveable door panel is configured for movement such that a longitudinal position of the door panel with respect to the seat can be maintained with corresponding seat movement. The moveable door panel can help provide a perception to a seat occupant that they are properly positioned within the passenger cabin, even at an extreme rearward seat position.

20 Claims, 2 Drawing Sheets

VEHICLE WITH MOVEABLE INTERIOR DOOR PANEL

TECHNICAL FIELD

The present disclosure relates generally to personal automotive vehicles with reconfigurable passenger cabins and is particularly pertinent to autonomous vehicles.

BACKGROUND

Personal automotive vehicles have evolved over several decades to require less attention from a human driver during vehicle operation. For instance, modern automobiles may be equipped with headlights that self-illuminate in low lighting conditions, windshield wipers that self-activate during rainy weather, or climate-control systems that automatically regulate the temperature of the passenger, to name a few examples. Emerging technologies now enable automobiles to continuously monitor surrounding road and traffic conditions, have real-time knowledge regarding the global position of the vehicle, and to control vehicle acceleration, braking, and navigation based on this information. The trend is toward fully autonomous vehicles, in which little to no attention to vehicle operation is required from vehicle occupants once a destination for the vehicle is determined. In such vehicles, vehicle occupants are free to turn their attention to matters other than driving, such as work-related tasks, entertainment, or relaxation.

During the transition from traditional driver-operated vehicles to fully autonomous vehicles, reconfigurable passenger cabins may be employed to accommodate both a driver mode and an autonomous mode. With driver attention to vehicle operation not required in the autonomous mode, the driver may wish to assume a different or more comfortable seating position than the one required during traditional vehicle operation, in which driver feet must be near the accelerator and brake pedal and driver arms must be able to reach and turn the steering wheel, operate turn signals, etc. Indeed, in traditional driver-operated vehicles, there is very little room available for occupants to assume different seating positions. This is particularly true in the front row of seats where the driver and/or passenger is closely surrounded by a center console, instrument panel(s), arm rests, and steering wheel. It may thus become desirable to increase the amount of free space surrounding the vehicle occupants in the autonomous vehicle mode to allow more freedom of movement. This comes with a whole new set of problems not before encountered in a vehicle passenger cabin. For instance, during an autonomous mode, passengers may wish to fully extend their legs by repositioning the seat toward the rear of the vehicle, only to find that other vehicle conveniences are then out of their reach.

U.S. Patent Application Publication No. 2015/0203006 by Hipshier et al. discloses an arm rest that is movable along an interior door panel, the primary purpose of which is to cover and uncover a storage compartment built into the door panel, but does not address problems encountered when the seating position of the passenger is such that he cannot reach the door.

SUMMARY

In accordance with an embodiment, a personal automotive vehicle having a reconfigurable passenger cabin includes a vehicle body, a door mounted to the vehicle body, a moveable door panel coupled with the door, and a seat located in the passenger cabin. The door is moveable to provide passenger access into and out of the passenger cabin, and the moveable door panel partly defines an interior of the passenger cabin. The seat is coupled with the body of the vehicle for movement between a forward position and a rearward position and has an inboard side and an opposite outboard side located between the inboard side and the door. The door panel is moveable with respect to the door between a forward position and a rearward position such that a longitudinal position of the door panel with respect to the seat can be maintained over a majority of the full range of seat movement.

In some embodiments, the vehicle includes a stationary panel mounted to the door between the moveable door panel and the door to conceal a hollow space between the stationary panel and the door when the moveable door panel is moved away from its forward position. The stationary panel has a decorative side facing the interior of the passenger cabin, and at least a portion of the decorative side of the stationary panel is covered by the moveable door panel when the moveable panel is in the forward position and uncovered when the moveable panel is in the rearward position.

In some embodiments, the moveable panel includes an armrest.

In some embodiments, the vehicle includes one or more crash energy absorbers attached to a back side of the moveable door panel that move with the door panel between the forward and rearward positions.

In some embodiments, the vehicle has front and rear doors and the vehicle body includes a B-pillar separating corresponding front and rear door openings of the body. The moveable door panel is coupled with the front door, and at least a portion of the moveable door panel is located rearward of the B-pillar when the door panel is in the rearward position.

In some embodiments, the vehicle has front and rear doors, the vehicle body includes a B-pillar separating corresponding front and rear door openings of the body, and the moveable door panel is coupled with the front door. The seat comprises a seat bottom, and at least a portion of the seat bottom is located rearward of a front side of the B-pillar when the seat is in the rearward position. In some such embodiments, at least a majority of the seat bottom is located rearward of the front side of the B-pillar when the seat is in the rearward position.

In some embodiments, the seat is coupled with the vehicle body for rotational movement between a forward-facing position and an inwardly-rotated position.

In some embodiments, movement of the moveable door panel is coordinated with movement of the seat.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a moveable door panel facing the interior of a passenger cabin of a personal automotive vehicle. The moveable door panel is configured such that a longitudinal position of the door panel with respect to an adjacent seat can be maintained over most of the range, and preferably the full range, of seat movement between forward and rearward positions. A seat occupant can thereby be provided with a perception that he is properly positioned within the passenger cabin, even at an extreme rearward seat position. While presented in the context of a front row of seats in the passenger cabin of an autonomous vehicle, the teachings presented herein are applicable to non-autonomous vehicles as well. For example, the unconventional passenger cabin configurations presented here may be employed while a vehicle is parked and/or used with second or third row seating.

Figure 1:
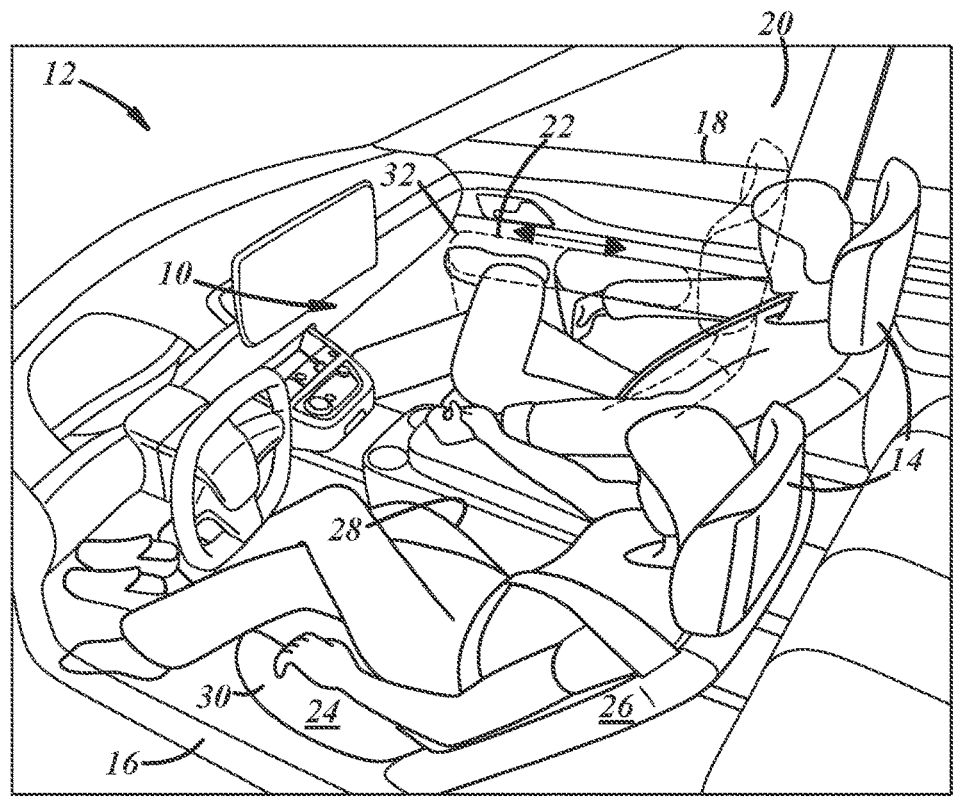
FIG. 1 is a view of an interior of a reconfigurable passenger cabin of a personal automotive vehicle.

FIG. 1 illustrates the interior of a passenger cabin 10 of a personal automotive vehicle 12. As used herein, the term "personal automotive vehicle" is intended to include those types of vehicles intended primarily for personal use that usually have one to three rows of seats and are generally sized to fit in home garages and standard-size parking spaces. Examples include passenger cars, coupes, sedans, SUVs, cross-over vehicles, and light-duty pick-up trucks. The illustrated passenger cabin 10 is reconfigurable between a driving configuration and an autonomous configuration. FIG. 1 shows the passenger cabin 10 configured in one example of an autonomous configuration in which front row vehicle seats 14 are in a position that is farther rearward than in a conventional passenger car. The vehicle 12 includes a vehicle body 16, a door 18 mounted to the vehicle body, and one or more seats 14 located in the passenger cabin 10. The door 18 has a window 20 and is mounted to the vehicle body 16 in a movable fashion (e.g., hinged) to provide passenger access into and out of the passenger cabin when the door is moved away from the illustrated closed position to an open position. A moveable door panel 22 is coupled with the door 18 and partly defines the interior of the passenger cabin 10 when the door is closed.

Each seat 14 in this example includes a seat bottom 24 by which the seat 14 is coupled with a floor of the vehicle body, and a seat back 26 extending upward from a rear end of the seat bottom 24. Each seat also has an inboard side 28 located toward the transverse center of the vehicle 12 and an opposite outboard side 30 located between the inboard side and the nearest door 18. The seats 14 are illustrated in a forward-facing position in FIG. 1 and may be coupled with the vehicle body 16 for rotational movement between the forward-facing position and an inwardly-rotated position as discussed further below. The seats 14 are also moveable between a forward position (shown in broken lines in FIG. 1) and the illustrated rearward position. Likewise, the moveable door panel 22 is coupled with the door 18 for movement between corresponding forward (shown in broken lines) and rearward positions such that a longitudinal (i.e., front-to-rear) position of the door panel 22 with respect to the seat 14 can be maintained over the full range of seat movement. In this embodiment, the moveable door panel 22 includes an armrest 32 vertically above the seat bottom 24 and extending forward of the longitudinal position of the seat back 26.

Figure 2:
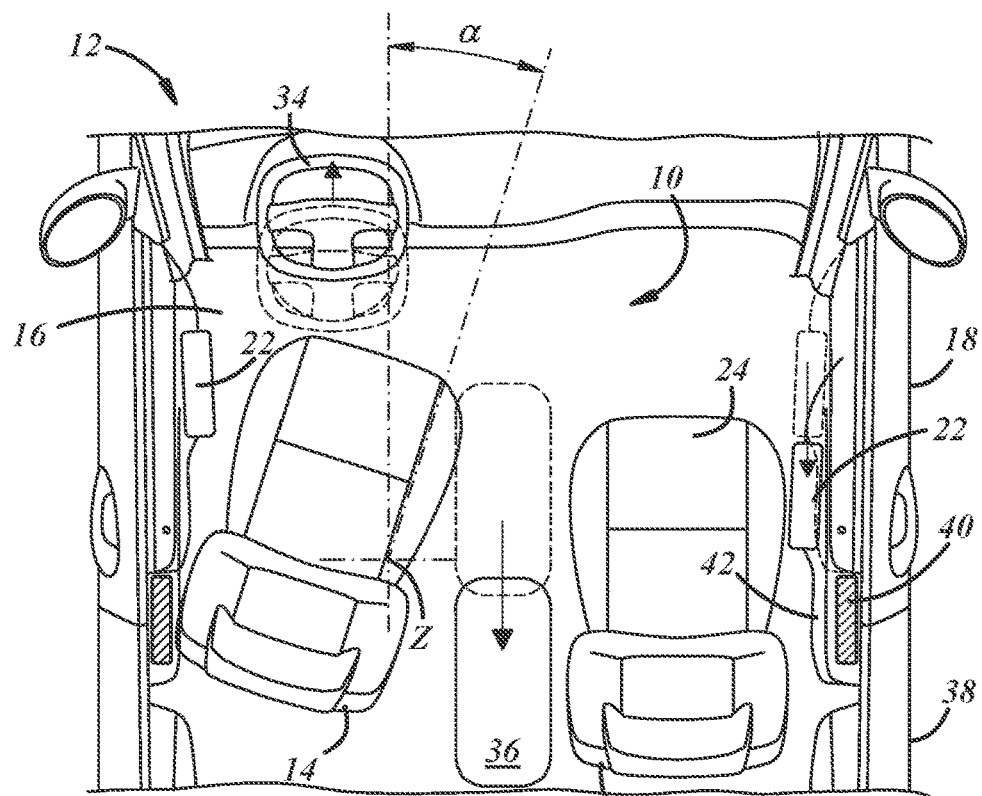
FIG. 2 is a top view of an interior of a passenger cabin illustrating a vehicle seat in an inwardly-rotated position and a moveable door panel on each side of the passenger cabin.

The moveable door panel 22 is illustrated on the passenger side (i.e., no steering wheel) of the vehicle 12 in FIG. 1 but is applicable to the driver side of the vehicle as well. FIG. 2 is a top view of the front row of seats 14 of the vehicle 12 in another example of the autonomous configuration. In this example, the driver side seat 14 is shown in the inwardly-rotated position with the seat rotated about a vertical axis Z by an angle α of about 15-25 degrees from the forward-facing position. Both seats 14 are also moved to the rearward position farther away from the front of the vehicle 12 than when in the driving configuration of the cabin 10 and the forward position of the seats. Other characteristics of the autonomous configuration may include a steering wheel 34 in a retracted position, farther toward the front of the vehicle than when in the driving configuration, and a center console 36 in a stowed position, farther rearward and/or lower than when in the driving configuration.

In the illustrated example, moveable door panels 22 are included on the doors 18 of both the driver side and the passenger side of the vehicle 12. In the case of a non-autonomous vehicle, the moveable door panel may be included only on the passenger side of the vehicle. The driver side moveable door panel 22 is illustrated in the forward position, and the passenger side moveable door panel 22 is illustrated in the rearward position with the forward position shown in broken lines. The doors 18 in this case are front doors, and the vehicle 12 further includes a pair of rear doors 38 on opposite left and right sides of the cabin 10. In a vehicle so-equipped, the vehicle body 16 may include a B-pillar 40 separating corresponding front and rear door openings of the body. The B-pillar 40 is a structural member of the body 16 that generally extends vertically from a floor to a roof of the vehicle body. A line extending between B-pillars 40 on opposite sides of the vehicle 12 may be considered an imaginary boundary between front row and second row seating areas of a conventional vehicle.

As indicated in FIG. 2, with full passenger attention not required in an autonomous vehicle mode, one or both seats 14 may be coupled with the vehicle body 16 for movement between forward and rearward positions that are spaced apart by an unconventionally large amount. For instance, the rearward position of each seat 14 may be such that at least a portion of each seat back 26 is rearward of the adjacent B-pillar 40. In some cases, the entire seat back 26 may be rearward of the B-pillar 40 such that a portion of the seat bottom 24 is in the same longitudinal position as the B-pillar and/or at least a portion of the seat bottom is located rearward of a front side of the B-pillar. In other embodiments, the rearward position of one or both seats 14 may be such that at least a majority of the seat bottom 24 (e.g., a rear half of the seat bottom) is located rearward of the front side of the B-pillar, at least a majority of the seat bottom is located rearward of a rear side of the B-pillar, all of the seat bottom is located rearward of the front side of the B-pillar, or all of the seat bottom is located rearward of the rear side of the B-pillar. As shown in FIG. 2, when the moveable panel 22 is in the rearward position, a rear portion 42 of the panel may be at the same longitudinal position as the B-pillar and/or extend rearward of the B-pillar.

Figure 3:
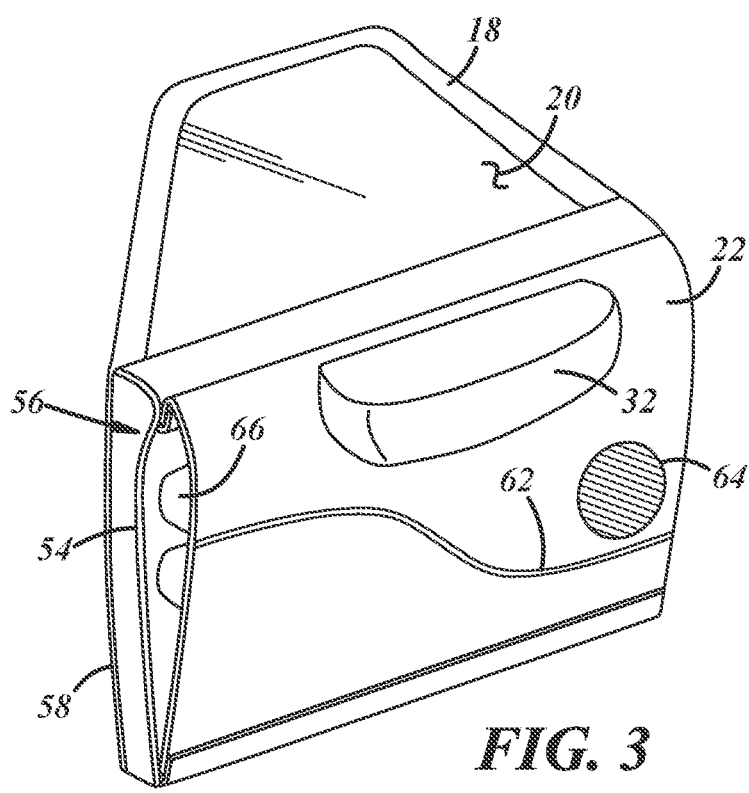
FIG. 3 is a front perspective view of the moveable door panel in a forward position.
Figure 4:
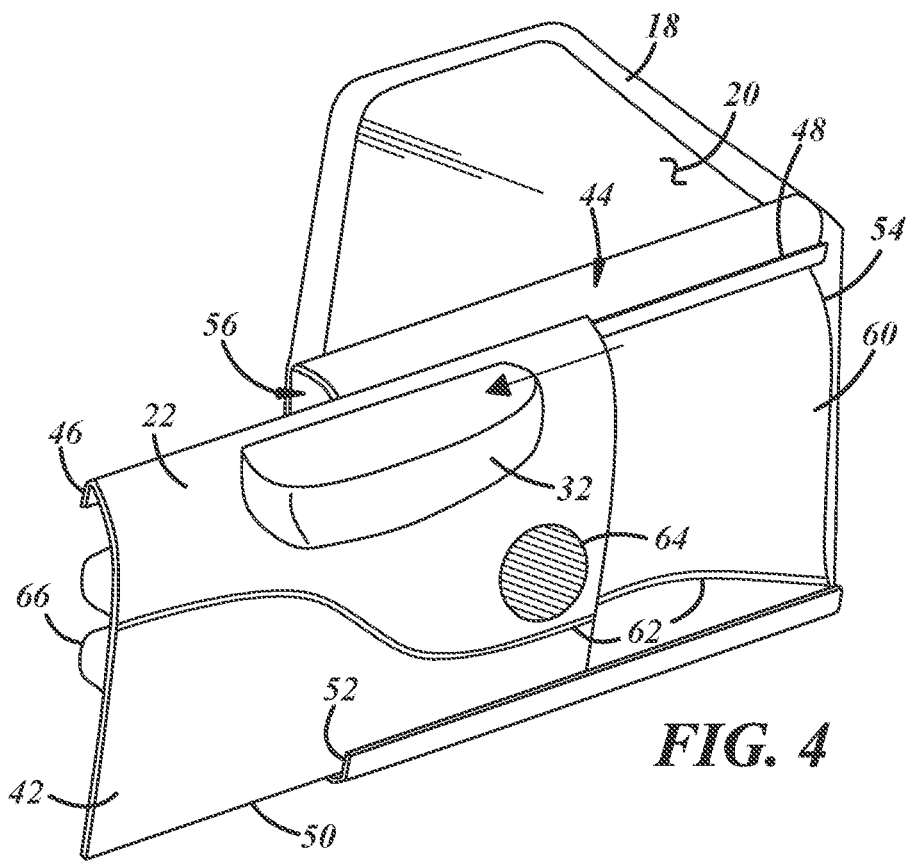
FIG. 4 is the front perspective view of the moveable door panel of FIG. 3 in a rearward position.

FIGS. 3 and 4 are front perspective views of an example of the moveable door panel 22 as seen from the interior of the passenger cabin when attached to the driver side door 18. A rear portion of the door-panel assembly is cutaway to illustrate additional features. FIG. 3 illustrates the moveable panel 22 in the forward position, and FIG. 4 illustrates the moveable panel in the rearward position. The moveable panel 22 may assume other positions between the forward and rearward positions in order to maintain its longitudinal position with respect to the adjacent vehicle seat, which may also assume various positions between the forward and rearward positions. Movement of the panel 22 with respect to the door 18 is translational in the longitudinal direction. In the particularly illustrated embodiment, the moveable panel 22 is coupled with the door 18 via a movement mechanism 44. In this example, the movement mechanism 44 comprises a tongue or flange 46 along a top side of the panel 22 that is in sliding engagement with a groove 48 that is in a fixed position with respect to the door 18. Another edge 50 at the bottom side of the panel 22 is in sliding engagement with another groove 52 that is in a fixed position with respect to the door 18. This is of course only one example of the translational movement mechanism 44, as various other mechanisms may be employed, such as wheel-on-rail, pin-in-slot, rack-and-pinion, etc. Bearing surfaces with which the panel 22 comes in contact during movement may be part of the door 18 or provided by some other component attached to the door.

In this example, a portion of the movement mechanism 44 is provided by a stationary panel 54 that is mounted to the door 18 in a fixed position relative to the door. The stationary panel 54 is located between the door 18 and the moveable panel 22 such that the moveable panel 22 is coupled with the door 18 via the stationary panel. The stationary panel 54 may be mounted to the door via conventional fastening techniques, such as via pins or bosses extending from a back side of the stationary panel and engaging receiving apertures of the door 18. As is sometimes the case with conventional vehicle door constructions, a hollow space 56 is formed between an exterior panel 58 of the door 18 and the interior panel 22. This hollow space 56 may accommodate various other components of the vehicle and its various systems, such as electrical wiring, portions of audio speakers, structural members, crash energy absorbing members, window regulators, etc.

In addition to providing a portion of the movement mechanism 44, the stationary panel 54 may also conceal at least a portion of the hollow space 56 that exists between the door 18 and the moveable panel 22 which would otherwise be revealed when the panel 22 is moved away from the forward position. As such, the stationary panel 54 has a decorative side 60 facing toward the interior of the passenger cabin. At least a portion of this decorative side 60 is covered by the moveable door panel 22 when the moveable panel is in the forward position of FIG. 3 and uncovered when the moveable panel is in the rearward position of FIG. 4. The exposed portion of the stationary panel 54 may be made decorative, for example, via use of colors, fabrics, textures, shapes, and/or materials that are aesthetically coordinated with other visible decorative panels in the vehicle interior. The illustrated example includes coordinated style lines 62 on each of the moveable and stationary panels 22, 54 as one technique for maintaining desirable aesthetics even when the panel 22 is moved away from its forward position, which is the position the panel is in when the vehicle passengers first enter the vehicle.

The moveable door panel 22 helps provide a vehicle occupant with the perception of proper positioning within the passenger cabin, even when the vehicle seat in which the occupant is sitting has been moved to an unconventionally rearward position. The perception is achieved, for example, by the seat occupant finding the armrest 32 of the door panel 22 in the same position relative to the seat and therefore the same subjective position with respect to the seat occupant. Though not illustrated in the figures, other vehicle components typically found on interior door panels may be configured to move with the moveable panel 22 to enhance the effect. For instance, if the seat occupant is accustomed to reaching in a particular direction and distance to access a door-mounted cup holder when the vehicle is in the driver mode, he can expect to make the same reach in the same direction when the vehicle is in the autonomous mode. In another example, a door-mounted audio speaker 64 may be configured to move with the moveable panel 22 so that the directionality of the source of music, auditory GPS instructions, or a telephone voice remains consistent in all possible seating positions between the forward and rearward seat positions.

In the described embodiment, a range of movement of the door panel 22 corresponds to a range of forward-rearward movement of the seat 14, so that the door panel can be in exact longitudinal correspondence with respect to the seat in its most rearward position. However, a sufficient level of comfort can be offered to the seat occupant if the door panel does not move over the full range of the seat movement but moves over most of this range. In such cases, a longitudinal offset of a few centimeters may be present between the full rearward positions of the seat and the door panel, and the occupant may still use the armrest of the door panel or activate commands on the door panel without excessive reaching effort.

Another feature of the moveable panel 22 may include one or more impact energy absorbing elements 66 that move together with the panel 22 between the forward and rearward positions. The illustrated elements 66 may be referred to as "crash cones" and are typically hollow and tapered plastic projections designed to be crushed or crumpled in the event of a side-impact vehicle collision and to thereby absorb some portion of the kinetic crash energy before it reaches the seat occupant. Other energy absorbing elements such as plastically deformably foam blocks or honeycomb structures may be affixed to the panel 22 for movement with the panel. As shown in the figures, the energy absorbing elements 66 may be positioned near the rear portion or end 42 of the moveable panel and vertically just above a seating surface of the seat bottom. Here, the energy absorbers 66 are generally aligned with the pelvic region of the seat occupant. One newly encountered problem with the unusually-far rearward seating positions available in the autonomous configuration of the passenger cabin is that any impact energy absorbers 66 that are properly positioned while the vehicle is in the driver mode are improperly positioned when the vehicle switches to the autonomous mode. This reveals yet another unexpected benefit of the moveable panel 22 in that proper alignment of vehicle safety components can be maintained.

The reconfigurable passenger cabin 10 may be configured so that the moveable door panel 22 can only move toward the rearward position when the appropriate seat 14 is moved toward its rearward position. A lock-out mechanism may be provided to facilitate this type of coordinated movement, whether mechanical, electro-mechanical, sensor-based, or some combination thereof. For instance, power-adjustable seats may have their positional control actuators in electrical communication with seat-moving motors as well as motors in the door that move the moveable door panel. An autonomous vehicle configured for automated changes between the driving and autonomous modes and cabin configurations may be electronically programmed for such coordinated movement, with solenoids or servos providing component movement in response to initiation of a system mode change and/or with sensors or encoders, for example, providing information to a system processor regarding real-time position information about each moving component.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A personal automotive vehicle having a reconfigurable passenger cabin, comprising:
    a vehicle body;
    a door mounted to the vehicle body and moveable to provide passenger access into and out of the passenger cabin;
    a moveable door panel coupled with the door that partly defines an interior of the passenger cabin, the moveable door panel having a top side and a bottom side that is vertically spaced from the top side;
    a seat located in the passenger cabin and coupled with the body of the vehicle for movement between a forward position and a rearward position, the seat having an inboard side and an opposite outboard side located between the inboard side and the door,
    wherein the door panel is moveable with respect to the door between a forward position and a rearward position such that a longitudinal position of the door panel with respect to the seat can be maintained over a majority of the full range of seat movement, and
    wherein the moveable panel includes an armrest as only a portion of the moveable panel, the armrest being located between the top side and the bottom side of the moveable panel and spaced apart from the bottom side of the moveable panel.

2. A personal automotive vehicle as defined in claim 1, further comprising a stationary panel mounted to the door between the moveable door panel and the door to conceal a hollow space between the stationary panel and the door when the moveable door panel is moved away from its forward position, the stationary panel having a decorative side facing the interior of the passenger cabin, wherein at least a portion of the decorative side of the stationary panel is covered by the moveable door panel when the moveable panel is in the forward position and uncovered when the moveable panel is in the rearward position.

3. A personal automotive vehicle as defined in claim 1, further comprising one or more crash energy absorbers that move with the door panel between the forward and rearward positions.

4. A personal automotive vehicle as defined in claim 1 and having front and rear doors, the vehicle body comprising a B-pillar separating corresponding front and rear door openings of the body and the moveable door panel being coupled with the front door, wherein at least a portion of the moveable door panel is located rearward of the B-pillar when the door panel is in the rearward position.

5. A personal automotive vehicle as defined in claim 1 and having front and rear doors, the vehicle body comprising a B-pillar separating corresponding front and rear door openings of the body and the moveable door panel being coupled with the front door, wherein the seat comprises a seat bottom and at least a portion of the seat bottom is located rearward of a front side of the B-pillar when the seat is in the rearward position.

6. A personal automotive vehicle as defined in claim 5, wherein at least a majority of the seat bottom is located rearward of the front side of the B-pillar when the seat is in the rearward position.

7. A personal automotive vehicle as defined in claim 1, wherein the seat is coupled with the vehicle body for rotational movement between a forward-facing position and an inwardly-rotated position.

8. A personal automotive vehicle as defined in claim 1, wherein movement of the moveable door panel is coordinated with movement of the seat.

9. A personal automotive vehicle having a reconfigurable passenger cabin, comprising:
    a vehicle body;
    a door mounted to the vehicle body and moveable to provide passenger access into and out of the passenger cabin;
    a moveable door panel coupled with the door that partly defines an interior of the passenger cabin;
    a seat located in the passenger cabin and coupled with the body of the vehicle for movement between a forward position and a rearward position, the seat having an inboard side and an opposite outboard side located between the inboard side and the door,
    wherein the door panel is moveable with respect to the door between a forward position and a rearward position such that a longitudinal position of the door panel with respect to the seat can be maintained over a majority of the full range of seat movement,
    the personal automotive vehicle further comprising one or more crash energy absorbers attached to a back side of the moveable door panel that move with the door panel between the forward and rearward positions.

10. A personal automotive vehicle as defined in claim 9, further comprising a stationary panel mounted to the door between the moveable door panel and the door to conceal a hollow space between the stationary panel and the door when the moveable door panel is moved away from its forward position.

11. A personal automotive vehicle as defined in claim 9, wherein the moveable panel includes an armrest.

12. A personal automotive vehicle as defined in claim 9, wherein at least a portion of the moveable door panel is located rearward of a B-pillar of the vehicle body when the door panel is in the rearward position.

13. A personal automotive vehicle as defined in claim 9, wherein the seat comprises a seat bottom and at least a portion of the seat bottom is located rearward of a front side of a B-pillar of the vehicle body when the seat is in the rearward position.

14. A personal automotive vehicle as defined in claim 9, wherein the seat is coupled with the vehicle body for rotational movement between a forward-facing position and an inwardly-rotated position.

15. A personal automotive vehicle having a reconfigurable passenger cabin, comprising:
   a vehicle body;
   a door mounted to the vehicle body and moveable to provide passenger access into and out of the passenger cabin;
   a moveable door panel coupled with the door that partly defines an interior of the passenger cabin;
   a seat located in the passenger cabin and coupled with the body of the vehicle for movement between a forward position and a rearward position, the seat having an inboard side and an opposite outboard side located between the inboard side and the door,
   wherein the door panel is moveable with respect to the door between a forward position and a rearward position such that a longitudinal position of the door panel with respect to the seat can be maintained over a majority of the full range of seat movement,
   wherein the personal automotive vehicle has front and rear doors, the vehicle body comprising a B-pillar separating corresponding front and rear door openings of the body and the moveable door panel being coupled with the front door, wherein at least a portion of the moveable door panel is located rearward of the B-pillar when the door panel is in the rearward position.

16. A personal automotive vehicle as defined in claim 15, further comprising a stationary panel mounted to the door between the moveable door panel and the door to conceal a hollow space between the stationary panel and the door when the moveable door panel is moved away from its forward position.

17. A personal automotive vehicle as defined in claim 15, wherein the moveable panel includes an armrest.

18. A personal automotive vehicle as defined in claim 15 and further comprising one or more crash energy absorbers that move with the door panel between the forward and rearward positions.

19. A personal automotive vehicle as defined in claim 15, wherein the seat comprises a seat bottom and at least a portion of the seat bottom is located rearward of a front side of a B-pillar of the vehicle body when the seat is in the rearward position.

20. A personal automotive vehicle as defined in claim 15, wherein the seat is coupled with the vehicle body for rotational movement between a forward-facing position and an inwardly-rotated position.

* * * * *